United States Patent [19]

Glance et al.

[11] 4,383,332

[45] May 10, 1983

[54] HIGH CAPACITY DIGITAL MOBILE RADIO SYSTEM

[75] Inventors: Bernard Glance, Colts Neck; Paul S. Henry, Holmdel, both of N.J.

[73] Assignee: Bell Telephone Laboratories, Incorporated, Murray Hill, N.J.

[21] Appl. No.: 209,146

[22] Filed: Nov. 21, 1980

[51] Int. Cl.³ .......................... H04B 7/08; H04B 7/02
[52] U.S. Cl. ....................................... 455/33; 455/52; 370/29; 375/40
[58] Field of Search ..................... 455/33, 34, 35, 39, 455/50, 51, 52, 53, 54, 56, 62, 63, 65, 134, 135, 137, 139, 276, 278, 289; 370/29, 32, 58, 67, 85; 375/40, 38

[56] References Cited

U.S. PATENT DOCUMENTS

| | | | |
|---|---|---|---|
| 3,566,274 | 2/1971 | Di Toro | 455/137 |
| 3,631,494 | 12/1971 | Gans | 455/52 |
| 3,662,268 | 5/1972 | Gans | 455/52 |
| 3,663,107 | 1/1972 | Brady | 455/137 |
| 3,693,088 | 9/1972 | Rustako | 455/52 |
| 3,696,421 | 10/1972 | Bitler | 455/276 |
| 3,717,814 | 2/1973 | Gans | 455/52 |
| 4,057,758 | 1/1977 | Hattori | 455/52 |

OTHER PUBLICATIONS

A Mobile Radio Single–Frequency two–way Diversity System Using Adaptive Retransmission from the Base, by J. S. Bitler et al. IEEE Transactions on Communications, vol. COM-21, No. 11, pp. 1241 to 1247, Nov. 1973.
Diversity Techniques for Mobile Radio Reception, by J. D. Parsons et. al., IEEE Transactions on Vehicular Technology, vol. VT-25, No. 3 pp. 75-85, Aug. 1976.
Fundamentals of Diversity Systems, Diversity Techniques, by W. C. Jakes, Microwave Mobile Communications, New York: Wiley, pp. 309-531 Published 1974.

*Primary Examiner*—Tommy P. Chin
*Attorney, Agent, or Firm*—Erwin W. Pfeifle

[57] ABSTRACT

The present invention relates to a mobile radio base station (14) capable of communicating with a large number of mobile stations by implementing space diversity and time-division retransmission techniques in a digital communication system. The digital base station contains a plurality of antenna elements ($16_1$–$16_M$) and a plurality of retransmission branches ($18_1$–$18_M$) associated in a one-to-one relationship. When the base station receives a digital communication signal from a mobile station, each antenna element receives the signal with a unique random phase ($\theta_1$–$\theta_m$) due to the effects of the environment on signal transmission. The signal is then processed through the plurality of retransmission branches, where each branch adapts to compensate for the random phase of the signal received by its associated antenna element. Conversely, when the base station transmits a signal back to the mobile station, each retransmission branch adds the conjugate of its associated random phase to the signal to be transmitted, allowing the environment to "undo" the effect of the conjugate random phase so that the signals transmitted by the plurality of antenna elements will arrive coherently at the mobile station.

13 Claims, 4 Drawing Figures

HIGH CAPACITY DIGITAL MOBILE RADIO SYSTEM

BACKGROUND OF THE INVENTION

1. Field of the Invention

The present invention relates to a high capacity digital mobile radio system, and more particularly, to a digital mobile radio system which employs the techniques of space diversity and time-division retransmission to form a system where all the required adaptive signal processing is performed at baseband at the base station.

2. Description of the Prior Art

Radio signals are always subject to fading due to natural phenomena, but when one station of a radio link is mobile and moving at variable speeds through various and unpredictable environments, the situation is seriously compounded. In such a situation there are two types of received signal level variations observed. First there is the rapid multipath Rayleigh type fading due to different path cancellations and then there is a slower variation in the mean signal level due to gross path variations from building shadowing and other terrain effects. Both types of signal level variations are functions of the speed of the mobile.

Space diversity has been found to provide one of the best solutions to mobile radio fading. One analog mobile radio system employing space diversity is disclosed in U.S. Pat. No. 3,693,088 issued to A. J. Rustako, Jr., et al on Sept. 19, 1972. There, diversity transmission from the base to the mobile is provided by switching between two spaced base transmitting antennas on command from the mobile. More particularly, means are provided at the mobile station for determining when the signal level then being received by the mobile from a given base station antenna falls below a level which depends upon the nature of the fade itself. When this occurs, the mobile transmits an out of message band signal back to the base which causes the base to switch to a different antenna.

A similarly operated digital mobile radio system is disclosed in U.S. Pat. No. 4,057,758 issued to T. Hattori et al on Nov. 8, 1977. There, a plurality of receiving antenna systems are switched at a constant frequency higher than the signaling rate of the digital baseband signal but less than the frequency shift width of the frequency modulated wave or less than a product of the maximum phase shift of the phase modulated wave and the signaling rate, so that average-power dispersion in a signal element of the digital baseband signal received at the receiving antenna system is effectively compressed. Alternatively, the plurality of antennas may be transmitting antennas which are simultaneously switched to achieve compression of average power dispersion in the baseband signal elements.

The above-described analog and digital systems, however, require the flow of feedback information to control antenna switching, necessitating the use of complex and expensive apparatus at the mobile. Co-phasing of the antenna elements in an analog system has been found to provide transmission from a diversity station by means of a multi-element array, as disclosed in U.S. Pat. No. 3,717,814 issued to M. J. Gans on Feb. 20, 1973. Phase corrected intelligence signals are transmitted from a diversity array transmitter and received in-phase at a monochannel receiver. An individual pilot associated with each diversity branch and frequency separated from the pilots of the other branches is received along with the in-phase intelligence. All of the pilots are fed back, as part of the return modulation, to the diversity transmitter where they are used to establish the proper phase correction for the modulated intelligence transmission. However, the signal processing at the diversity transmitter as taught by Gans occurs at i. f., thus requiring the use of expensive RF hardware to achieve relatively accurate phase correction.

The problem remaining in the prior art is to provide a mobile radio system that does not require the excessive analog circuitry employed with analog systems and which is capable of higher capacity than the simple diversity associated with prior art digital systems.

SUMMARY OF THE INVENTION

The problem remaining in the prior art has been solved in accordance with the present invention, which relates to a high capacity digital mobile radio system, and more particularly, to a digital mobile radio system which employs the techniques of space diversity and time-division retransmission to form a system where all the required adaptive signal processing is performed at baseband at a base station location.

It is an aspect of the present invention to employ digital co-phasing techniques at the base station of a digital cellular mobile radio system in conjunction with the above-mentioned space diversity and retransmission properties to overcome the mobile radio transmission-related problems of intercell interference, shadow fading and Rayleigh fadings.

Other and further aspects of the present invention will become apparent during the course of the following description and by reference to the accompanying drawings.

BRIEF DESCRIPTION OF THE DRAWINGS

Referring now to the drawings in which like numerals represent like parts in several views.

DETAILED DESCRIPTION

Mechanical constraints, cost, and maintenance requirements all suggest that the equipment employed at the mobile stations of a mobile radio system should be kept as simple as possible. This goal has been achieved in accordance with the present invention with time-division retransmission, while retaining the advantages of space diversity processing. Instead of using a different frequency for each direction of communication, two-way communication between mobile and base station is conducted on a single time-shared channel. These basic principles of operation of the present invention may be understood by reference to FIGS. 1 and 2, which illustrate mobile-to-base and base-to-mobile communication, respectively.

Figure 1:
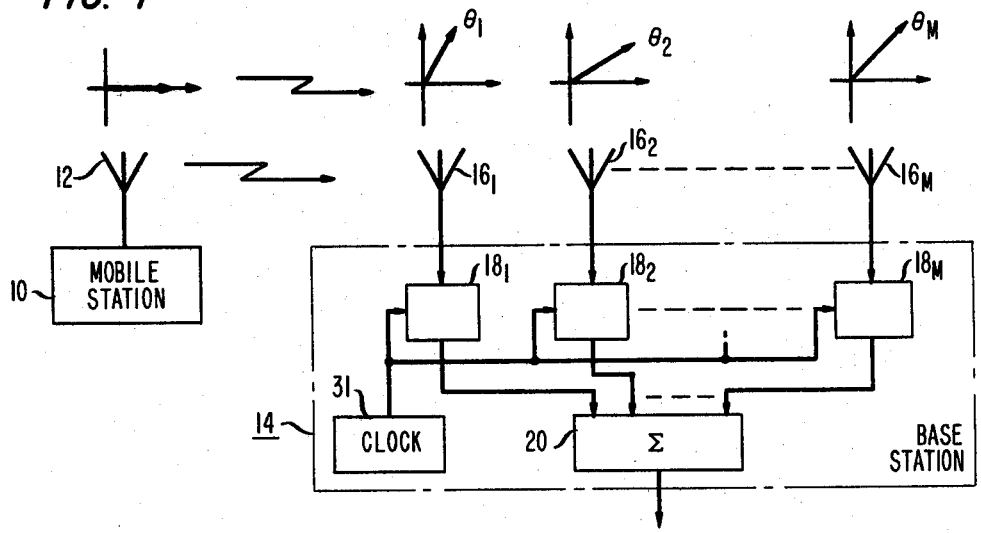
FIG. 1 illustrates the transmission of a signal from a mobile to a base station including a plurality of antenna elements and the random phase associated with each element in accordance with the present invention.

In the mobile-to-base communication scheme illustrated in FIG. 1, a mobile station 10 containing a single antenna element 12 transmits a message to a base station 14 which contains a plurality of antenna elements $16_1$, $16_2$, ... $16_M$, where the plurality of antenna elements are employed to provide for space diversity at base station 14. The detailed structure of the message transmitted from mobile station 10 to base station 14 will be explained in greater detail hereinafter in association with FIG. 3, but in general, mobile radio reception is characterized by large fluctuations in received signal power, P, at base station 14 as mobile 10 travels along a street. This variability can be modeled as the product of three factors, as shown by $$P(\bar{r}) = |\bar{r}|^{-n} S(\bar{r}) R^2(\bar{r}), \quad (1)$$

where $\bar{r}$ is the position vector denoting the location of mobile 10 relative to base station 14. The first factor, $|\bar{r}|^{-n}$, represents the general reduction in signal strength as mobile 10 recedes from base station 14. In free space, n=2, but in an urban environment it can be shown that n is in the range of 3 to 4. The second factor, $S(\bar{r})$, represents shadow fadings, which is primarily the result of blockage due to large objects such as buildings and hills. It has been found by measurement of S in several cities that it is approximately a log-normal random variable. The third factor, $R^2(\bar{r})$, in equation (1) represents Rayleigh fading, a phenomenon caused by the random addition of signals arriving at an antenna via multiple paths. The amplitude of the received envelope, R, may be modeled as a random variable with a probability density function $$p(R) = 2Re^{-R^2}. \quad (2)$$

Therefore, in accordance with the above-described random properties of signal strength, such as shadow fading and Rayleigh fading associated with transmission from mobile-to-base, each signal received at a separate antenna element $16_1$ through $16_M$ located at base station 14 will possess an independent random phase, $\theta_1$ through $\theta_M$, respectively. As will be described in greater detail hereinafter, each antenna element processes its associated received signal in its associated retransmission branch $18_1$ through $18_M$, respectively, to delete the random phase so that the M received signals may be added coherently in combiner 20 at base station 14. In addition to adjusting the phases of the M received signals, each transmission branch $18_1$ through $18_M$ also functions to adjust the respective weight of the received signal passing therethrough to achieve the optimum net signal-to-interference ratio (SIR) at base station 14. For equal power Gaussian interference at each retransmission branch, it can be shown that the best net SIR is achieved with a maximal-ratio combiner. Synchronization of reception of the plurality of antenna elements is achieved by employing a clock 31.

Figure 2:
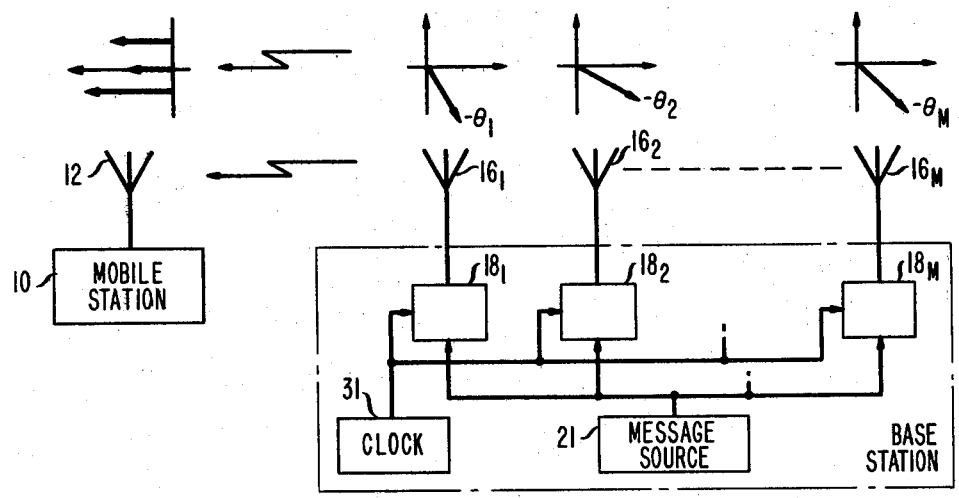
FIG. 2 illustrates the co-phased transmission of signals from the base station back to the mobile of FIG. 1, where the signals are pre-phased at the base so that they will be coherent upon reception by the mobile in accordance with the present invention.

The reverse transmission operation is illustrated in FIG. 2, where the message to be transmitted back to mobile 10 from base station 14 originates from a message source 21 and is applied via clock 31 as an input to each retransmission branch $18_1-18_M$. The base-to-mobile message signal is adapted by applying thereto the conjugate (negative) of the above-described random phases at each retransmission branch $18_1-18_M$ associated with antenna elements $16_1-16_M$, respectively. More specifically, retransmission branch $18_1$ applies a phase shift of $-\theta_1$ to the base-to-mobile message signal, retransmission branch $18_2$ a phase shift of $-\theta_2$, and so on, with retransmission branch $18_M$ applying a phase shift of $-\theta_M$ to the base-to-mobile message signal. These excitation phases $-\theta_1$ through $-\theta_M$ exactly compensate for the different phase delays experienced by the base-to-mobile message signals so that the transmission medium "undoes" the conjugate phase shift applied at each retransmission branch, thereby allowing the M signals to be received coherently at mobile 10. Therefore, since reception at mobile 10 will always be coherent as shown in the vector diagram of FIG. 2 associated with mobile 10, the receiver employed by the mobile may be extremely simple in form and yet provide adequate reception of the signal transmitted by base station 14.

Figure 3:
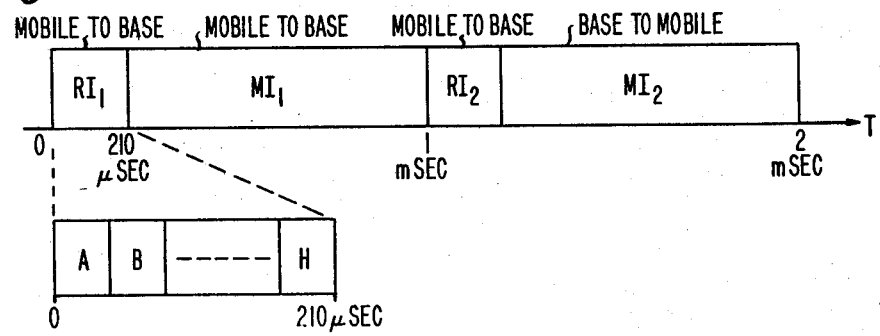
FIG. 3 illustrates an exemplary signaling frame including two reference intervals and two message intervals for implementing time-division retransmission between a mobile and a base station as illustrated in FIGS. 1 and 2, in accordance with the present invention.

A single frame in an exemplary mobile-to-base and base-to-mobile transmission in accordance with the time-division retransmission properties of the present invention is illustrated in FIG. 3. The basic frame consists of four time intervals including two reference intervals and two message intervals. Starting at time T=0, and assuming that the base station and all mobiles communicating with that base station are synchronized, a carrier burst is transmitted from the mobile 10 to the base station 14 during a reference interval $RI_1$. The carrier burst tramsmitted by the mobile 10 enables the base station 14 to identify the mobile and co-phase its antenna elements accordingly. The burst repetition rate is chosen to be rapid enough to ensure that the multipath conditions do not change significantly during the subsequent message transmission.

During the carrier burst transmission it is important that interference from unwanted mobiles be minimized so that the co-phasing of the antenna elements can be performed accurately. This minimization of interference may be accomplished, for example, by a time-division reference transmission method or a frequency offset reference transmission method. An illustration of a particular time-division scheme is included in the expanded version of $RI_1$ included in FIG. 3. Here, the reference intervalis divided into a plurality of unique time slots, labeled in this example, A through H, which are associated in a one-to-one relationship with eight separate pairs of communicating mobile and base stations, which are capable of interfering with each other. Therefore, if an exemplary base station is adapted to receive communication during, for example, a reference sub-interval B, the mobile desiring to communicate with that base will transmit its reference signal during the same sub-interval B. Thus, since each base station gates its receiver "on" only during its pre-assigned time slot in the reference interval, interference from other mobiles will be minimal. In a frequency-offset reference transmission scheme, each mobile and corresponding base station in a particular area is assigned a unique offset frequency which is a multiple $(0, \pm 1, \pm 2, \pm 3)$ of a low frequency $\Omega = 2\pi/T$, where T is the duration of reference interval $RI_1$. During the reference interval, the transmitting frequency of a mobile and the local oscillator at the base station are shifted from the carrier frequency $\omega_c$ by the offset assigned to its associated base station. The use of different reference frequencies allows the base station to select the desired reference signal and suppress the interference. The choice of $\Omega = 2\pi/T$ allows the various reference signals to be orthogonal; unwanted signals do not contribute to the co-phasing operation of the base station.

Once the base station identifies the mobile by its associated reference signal, the mobile then transmits its message to the base during message interval $MI_1$. For purposes of illustration only, to achieve, for example, a 32 kbit/sec transmission rate, which is necessary for speech transmission, 64 bits must be sent during the message interval of, in this example, 790 $\mu$sec, implying a baud rate of 81 kbaud/sec. This exemplary message interval of 790 $\mu$sec was determined by assuming that the entire mobile-to-base transmission interval is 1 msec, with 210 $\mu$sec reserved for reference interval $RI_1$. Depending on filtering and tolerable dB penalty, this exemplary rate would require 80–120 kHz bandwidth with binary PSK modulation.

In a cellular mobile radio system employing the above-described space diversity properties, co-channel interference from unwanted mobiles is effectively rejected and the same frequency channel may therefore be used in cells much closer together than is the case with existing analog systems. Therefore, fewer distinct channel sets are required and each cell is able to occupy a larger share of the total system bandwidth. Thus, for the example above, the number of mobiles that can be served in the 40-MHz bandwidth of the 850 MHz mobile radio band by employing the digital transmission techniques of the present invention is approximately 130. This high capacity of 130 mobiles/base illustrates the advantage of the digital system of the present invention over existing analog systems which have a much smaller capacity.

At the completion of message interval $MI_1$ the mobile transmits a second carrier burst during reference interval $RI_2$ to update the location information of the mobile with respect to the base, where the second carrier burst may be either one of the time-division or frequency-offset forms described hereinbefore. Once the location information has been updated, the message from the base to the mobile is transmitted during message interval $MI_2$. Like the time interval associated with $RI_1$ and $MI_1$, the reception of location update during $RI_2$ and base-to-mobile transmission during $MI_2$ also occurs, in this example, during a 1 msec period. Assuming, for example, that $RI_2$ is also 210 $\mu$sec in duration, the same baud rate of 81 kbaud/sec is associated with transmission during $MI_2$. At the end of 2 msec, therefore, an entire message cycle has occurred and the entire process starts again.

Figure 4:
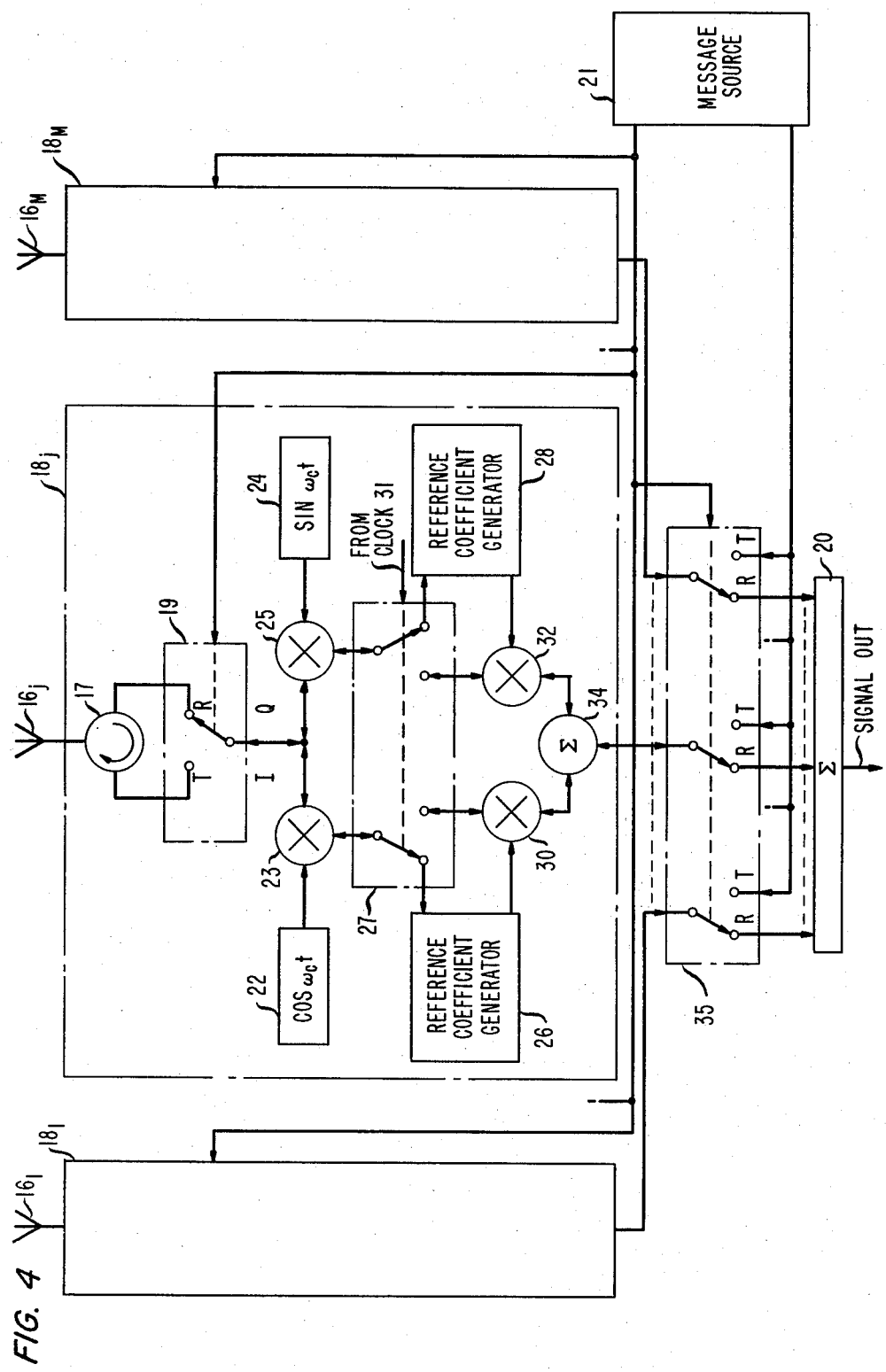
FIG. 4 contains a detailed embodiment of an exemplary diversity branch of the plurality of branches employed at the base station in association with the present invention.

The signal processing circuitry for an exemplary antenna element $16_j$ and its associated retransmission branch $18_j$ located at a base station formed in accordance with the present invention is illustrated in FIG. 4 and may be analyzed in conjunction with the timing sequence illustrated in FIG. 3. In the following discussion, any reference to the time-division or frequency-offset signaling schemes will be omitted for the sake of clarity, however, the use of these schemes to avoid co-channel interference is an obvious extension of the principles described hereinafter.

The reference signal received at an exemplary antenna element $16_j$ from a mobile (not shown) is of the form $R_j \cos(\omega_c t + \theta_j)$, where $\omega_c$ is the carrier frequency, $R_j$ is the Rayleigh amplitude and $\theta_j$ is the previously described random phase. Although both $R_j$ and $\theta_j$ are functions of time, they vary slowly and may be considered as remaining constant during reference interval $RI_1$.

The reference signal received by an antenna element $16_j$ passes through a circulator 17 and into a switch 19, where switch 19 controls the transmit and receive modes of operation of retransmission branch $18_j$. During reference interval $RI_1$ message interval $MI_1$ and reference interval $RI_2$, switch 19 remains in its "receive" position. After passing through switch 19 the reference signal is transmitted along two distinct signal paths of retransmission branch $18_j$, an I-rail and a Q-rail. The signal on the I-rail is applied as one input of a mixer 23, where the other input to mixer 23 is a local oscillator 22 which generates a $\cos \omega_c t$ signal. The output of mixer 23 is one quadrature component of the reference signal $R_j \cos(\omega_c t + \theta_j)$, specifically, $R_j \cos \theta_j$. In a like manner, the signal on the Q-rail is applied to one input of a mixer 25, where the remaining input to mixer 25 is a local oscillator 24 which generates a $\sin \omega_c t$ signal. The output of mixer 25 is, therefore, the remaining quadrature component of reference signal $R_j \cos(\omega_c t + \theta_j)$, specifically, $-R_j \sin \theta_j$.

Phasing of antenna element $16_j$ to receive a message signal possessing random phase $\theta_j$ is accomplished by passing the down-converted signals through separate reference coefficient generator circuits via a switch 27, the signal $R_j \cos \theta_j$ through a reference coefficient generator circuit 26 and the signal $-R_j \sin \theta_j$ through a reference coefficient generator circuit 28. Generators 26 and 28 produce reference coefficients $\alpha R_j \cos \theta_j$ and $-\alpha R_j \sin \theta_j$, respectively, where for the above-described time-division scheme reference coefficient generators 26 and 28 can be sample-and-hold circuits, which samples the carrier burst transmitted from a mobile during its pre-assigned sub-interval, as described hereinbefore. In accordance with the frequency-offset scheme, reference coefficient generators 26 and 28 may be of the form of well-known integrator circuits which integrate over the entire reference interval. Thus, reference coefficients $\alpha R_j \cos \theta_j$ and $-\alpha R_j \sin \theta_j$ modify the signal received by antenna element $16_j$ by phasing element $16_j$ to receive a message signal with random phase $\theta_j$, where $\alpha$ is a constant generated during the reference coefficient process.

At the completion of reference interval $RI_1$, a switch 27 is activated from a first to a second position by a clock signal from clock 31 to switch the outputs of mixers 23 and 25 from the inputs of reference coefficient generators 26 and 28 to the inputs to a pair of multipliers 30 and 32. In FIG. 4, reference coefficient generator 26 has its output coupled to an input to multiplier 30 and likewise, reference coefficient generator 28 has its output coupled to an input to multiplier 32.

The message transmitted from mobile-to-base during message interval $MI_1$ comprises, for example, 64 bits, where the $k^{th}$ bit and accompanying interference may be written as $$A_k R_j \cos(\omega_c t + \theta_j) + I_c \cos \omega_c t + I_s \sin \omega_c t, \qquad (3)$$

where $A_k = \pm 1$ represents the transmitted bit and $I_c$ and $I_s$ are Gaussian random variables with zero mean and variance $s^2$. The message bit is down-converted in retransmission branch $18_j$ through mixers 23 and 25 in a like manner as the above-described reference signal to form its quadrature components. The down-converted quadrature components of the $k^{th}$ bit appearing at the outputs of mixers 23 and 25 are then applied via switch 27 as inputs to multipliers 30 and 32, respectively, where the remaining inputs to the multipliers are its associated reference coefficient appearing at the outputs of reference coefficient generators 26 and 28, respectively. Specifically, the down-converted message bit on the I-rail from mixer 23 and reference coefficient $\alpha R_j \cos \theta_j$ from reference coefficient generator 26 are applied as inputs to a multiplier 30, and the down-converted message bit on the Q-rail from mixer 25 and reference coefficient $-\alpha R_j \sin \theta_j$ from reference coefficient generator 28 are applied as inputs to a multiplier 32. The output signals of multipliers 30 and 32 may be represented respectively by:

$$\alpha A_k R_j^2 \cos^2\theta_j + \alpha I_c R_j \cos\theta_j \text{ for the } I\text{-rail and} \quad (4)$$

$$\alpha A_k R_j^2 \sin^2\theta_j - \alpha I_s R_j \sin\theta_j$$

for the Q-rail.

These two signals are subsequently applied to an adder 34, resulting in an output signal of $\alpha A_k R_j^2$ and a mean-square noise term of $\alpha^2 R_j^2 s^2$.

Note that multiplication of the quadrature components of the message bit by their associated reference coefficients and subsequent summation thereof produces a demodulated, i.e., baseband, signal which is independent of the random phase $\theta_j$. Therefore, the demodulated signals produced by the remaining retransmission branches $18_1$–$18_M$ (not shown) will likewise be independent of their respective random phases $\theta_1$–$74_M$, and further, each signal possesses a magnitude proportional to $R^2$. Therefore, combiner 20 of base station 14 may comprise only a simple adder circuit to achieve the above-mentioned optimal maximal-ratio combination of the signals produced at the base station by retransmission branches $18_1$–$18_M$.

FIG. 4 may also be used to illustrate the signal flow from the base station back to the mobile. At the completion of the mobile-to-base message during message interval $MI_1$ switch 27 is reactivated and the outputs of mixers 23 and 25 are switched back to their first positions as inputs to predictors 26 and 28, respectively. The mobile then transmits a second carrier burst during reference interval $RI_2$ to update its propagation location information with respect to the base station. In general, this reference signal will travel through slightly different propagation conditions than the signal transmitted during $RI_1$. The up-dated random phase value $\theta_j$ stored in a like manner as the preceding $\theta_j$ by reference coefficient generators 26 and 28 will enable the base station to compensate for this new value of $\theta_j$.

At the completion of reference interval $RI_2$, switch $27_j$ is once again activated and the outputs of mixers 23 and 25 are switched back to their alternative positions as the inputs to multipliers 30 and 32, respectively. Also, switches 19 and 35 are activated at this time to switch retransmission branch $18_j$ from its "receive" mode to its "transmit" mode. The base 14 is then prepared to begin transmitting a message signal during message interval $MI_2$ back to the mobile. The message signal originates from message source 21, and the identical signal is introduced to the I- and Q-rails of each retransmission branch $18_1$–$18_M$ via switch 35 and adder 34. For transmission back to the mobile, the signal flow along the I- and Q-rails is reversed from that hereinbefore described with the reception of signals during periods $RI_1$, $MI_1$, and $RI_2$, with the phase conjugation described hereinabove in association with FIG. 2 accomplished by inverting the sign of the reference coefficient produced by reference coefficient generator 28. More particularly, the input message signal is directed by adder 34 to flow along the I- and Q-rails, where on the I-rail the message signal is applied as an input to multiplier 30, the other input to multiplier 30 being the updated reference coefficient stored in reference coefficient generator 26. On the Q-rail, the message signal is applied as an input to multiplier 32, the other input to multiplier 32 being the negative of the updated reference coefficient stored in reference coefficient generator 28, where the use of the negative, as described hereinabove, in conjunction with the processed signal on the I-rail, will allow the signal to be received coherently by the mobile station by "undoing" the effects of the environment. The outputs of multipliers 30 and 32 are then applied as inputs to mixers 23 and 25, where local oscillators 22 and 24 are also applied as inputs to mixers 23 and 25, respectively, to upconvert the quadrature components of the message signal. The upconverted signals are then combined and passed via switch 19 through circulator 17 and transmitted by antenna element $16_j$. This procedure gives the same SIR at the mobile as if all the transmitted power were radiated from a single antenna and the mobile included the same degree of diversity (M-branch in this example) as the base station.

We claim:

1. A mobile radio base station (14) employing space diversity and time-division retransmission comprising:

a plurality of M antenna elements ($16_1$, $16_2$, . . . , $16_M$) for operating in a space diversity mode capable of receiving a mobile-to-base communication signal from a remote station and transmitting a base-to-mobile communication signal to said remote station;

a plurality of M retransmission branches ($18_1$, $18_2$, . . . , $18_M$) associated in a one-to-one relationship with said plurality of M antenna elements and capable of operating in either one of a transmitting mode or a receiving mode, each retransmission branch when operating in its receiving mode being capable of compensating for the incoming random phase associated with said mobile-to-base communication signal and subtracting said random phase therefrom, and when operating in its transmitting mode being capable of adding said random phase to said base-to-mobile communication signal;

combining means (20) coupled to the outputs of said plurality of M retransmission branches when operating in their receiving mode and capable of combining said output signals of said branches to form a coherent output signal, and input means (21) capable of applying an input baseband signal to said plurality of retransmission branches when operating in their transmitting mode allowing said plurality of M antenna elements to transmit said base-to-mobile communication signal

CHARACTERIZED IN THAT the base station is capable of receiving and transmitting digital communication signals, wherein each retransmission branch includes means (22,23,24,25,26,28,30,32,34) capable of both down-converting the mobile-to-base communication signal to a baseband representation thereof and up-converting the input baseband signal to a phased base-to-mobile communication signal.

2. A mobile radio base station in accordance with claim 1

CHARACTERIZED IN THAT each retransmission branch of the plurality of retransmission branches includes a pair of converting means (22,23,24,25) capable of both (a) separating the mobile-to-base digital communication signal into a first quadrature component and a second quadrature component and transmitting said first and second quadrature components along a first and a second signal path, respectively, and (b) combining a first quadrature component of the base-to-mobile signal and a second quadrature component of said base-to-mobile signal to be transmitted by its associated antenna element ($16_j$).

3. A mobile radio base station in accordance with claim 2

CHARACTERIZED IN THAT the received mobile-to-base communication signal comprises in sequence a first reference signal, a first message signal and a second reference signal, wherein each signal path of the first and second signal paths of each retransmission branch includes reference coefficient generating means (26,28) responsive sequentially to its associated quadrature component of said first and second reference signals and capable of producing as sequential output signals a first and a second reference coefficient, said first and second reference coefficients associated with the sequential locations of the mobile station with respect to the antenna element.

4. A mobile radio base station employing frequency-offset reference transmission in accordance with claim 3

CHARACTERIZED IN THAT each reference coefficient generating means includes integrating means capable of integrating the first and second reference signals received during a first and a second reference interval ($RI_1$, $RI_2$), respectively, to produce the reference coefficient output signals.

5. A mobile radio base station employing time-division reference transmission in accordance with claim 3

CHARACTERIZED IN THAT each reference coefficient generating means includes sample-and-hold means capable of sampling and storing the first and second reference signals received by said predictor means during a first and a second reference interval ($RI_1$, $RI_2$), respectively, to produce the reference coefficient output signals.

6. A mobile radio base station in accordance with claims 3, 4 or 5

CHARACTERIZED IN THAT each signal path further includes a multiplier (30,32) being responsive to both (a) its associated quadrature component of the first message signal and the first reference coefficient produced by its associated predictor means for producing a baseband digital output signal, and (b) the base-to-mobile baseband signal and the second reference coefficient for producing a phased base-to-mobile digital communication signal.

7. A mobile radio base station in accordance with claim 6

CHARACTERIZED IN THAT the combining means includes an adder capable of combining the plurality of baseband digital output signals produced by each retransmission branch of the plurality of retransmission branches.

8. A time-division retransmission method of transmitting digital communication signals between at least one base station and at least one mobile station, the method comprising the steps of (a) transmitting a first carrier burst from the at least one mobile station during a first reference interval ($RI_1$), (b) transmitting message information from said at least one mobile station to said at least one base station during a first message interval ($MI_1$), (c) transmitting message information from said at least one base station to said at least one mobile station during a second message interval ($MI_2$)

CHARACTERIZED IN THAT the method comprises the further step of (d) prior to step (c), transmitting a second carrier burst from the at least one mobile station to the at least one base station during a second reference interval ($RI_2$).

9. The method according to claim 8 wherein the at least one base station comprises a plurality of base stations and said plurality of base stations are capable of communicating with the at least one mobile station

CHARACTERIZED IN THAT the method comprises the further steps of (e) in performing step (a) transmitting a first carrier burst from the at least one mobile station which is associated with one of the plurality of base stations during a predetermined sub-interval (A—H) of the first reference interval, each base station of said plurality of base stations being associated with a separate and distinct sub-interval of said first reference interval; and (f) in performing step (d) transmitting a second carrier burst from the at least one mobile station which is associated with one of said plurality of base stations during a predetermined sub-interval (A—H) of the second reference interval, each base station of said plurality of base stations being associated with a separate and distinct sub-interval of said second reference interval.

10. The method according to claim 8 wherein the at least one base station comprises a plurality of base stations and said plurality of base stations are capable of communicating with the at least one mobile station

CHARACTERIZED IN THAT the method comprises the further steps of (e) in performing step (a) transmitting a first carrier burst from the at least one mobile station to the plurality of base stations at a predetermined off-set frequency, each base station associated with a separate and distinct off-set frequency; and (f) in performing step (d) transmitting a second carrier burst from the at least one mobile station to the plurality of base stations at a predetermined off-set frequency, each base station associated with a separate and distinct off-set frequency.

11. A method of both compensating for the random phase associated with a mobile-to-base digital communication signal received at a base station and forming a baseband digital signal thereat, the method comprising the steps of:

(a) receiving at said base station a reference signal transmitted by a mobile station, (b) detecting the random phase of said reference signal, (c) receiving at said base station a message signal transmitted by said mobile station, and (d) compensating for the random phase detected in step (b) from said message signal received in step (c)

CHARACTERIZED IN THAT the method comprises the further steps of (e) in performing step (a), down-converting the reference signal into a first reference signal quadrature component and a second reference signal quadrature component, (f) in performing step (b), forming a first reference coefficient associated with the random phase of said first reference signal and a second reference coefficient associated with the random phase of said second reference signal, (g) in performing step (c), down-converting the message signal into a first message signal quadrature component and a second message signal quadrature component (h) in performing step (d), multiplying said first reference coefficient with said first message signal quadrature component to form a first baseband component, and multiplying said second reference coefficient with said second message signal quadrature component to form a second baseband component, (i) adding the first and second baseband components to form the baseband digital communication signal.

12. The method according to claim 11

CHARACTERIZED IN THAT in performing frequency-offset reference transmission the method comprises the further step of (j) in performing step (f), integrating each of the first and second reference signal quadrature components to form the first and second reference coefficients, respectively.

13. The method according to claim 11

CHARACTERIZED IN THAT in performing time-division reference transmission the method comprises the further step of (j) in performing step (f), sampling and holding each of the first and second reference signal quadrature components to form the first and second reference coefficients respectively.

* * * * *

UNITED STATES PATENT AND TRADEMARK OFFICE
CERTIFICATE OF CORRECTION

PATENT NO. : 4,383,332
DATED : May 10, 1983
INVENTOR(S) : Bernard Glance and Paul S. Henry It is certified that error appears in the above—identified patent and that said Letters Patent is hereby corrected as shown below:

Column 7, line 33, "$74_M$" should read --$\theta_M$--.

Signed and Sealed this

Sixth Day of December 1983

[SEAL]

Attest:

Attesting Officer

GERALD J. MOSSINGHOFF
Commissioner of Patents and Trademarks